United States Patent
Eleftheriadis et al.

(10) Patent No.: US 10,985,562 B2
(45) Date of Patent: Apr. 20, 2021

(54) REACTIVE POWER CONTROL IN POWER SYSTEMS

(71) Applicant: Telefonaktiebolaget LM Ericsson (publ), Stockholm (SE)

(72) Inventors: Lackis Eleftheriadis, Gävle (SE); Athanasios Karapantelakis, Solna (SE); Konstantinos Vandikas, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/971,033

(22) PCT Filed: Feb. 21, 2018

(86) PCT No.: PCT/SE2018/050165
§ 371 (c)(1),
(2) Date: Aug. 19, 2020

(87) PCT Pub. No.: WO2019/164425
PCT Pub. Date: Aug. 29, 2019

(65) Prior Publication Data
US 2021/0013718 A1   Jan. 14, 2021

(51) Int. Cl.
*H02J 3/18* (2006.01)
*H02J 3/00* (2006.01)
(Continued)

(52) U.S. Cl.
CPC .............. *H02J 3/18* (2013.01); *G05B 19/042* (2013.01); *H02J 3/003* (2020.01); *H02J 3/28* (2013.01);
(Continued)

(58) Field of Classification Search
CPC .... H02J 3/18; H02J 3/003; H02J 7/345; H02J 3/28; H02J 13/00022; H02J 2207/50; H02J 2203/20; G05B 19/042; G05B 2219/2639
See application file for complete search history.

(56) References Cited

U.S. PATENT DOCUMENTS 4,645,997 A   2/1987   Whited
4,647,837 A   3/1987   Stemmler
(Continued)

FOREIGN PATENT DOCUMENTS

EP   2863285 A2   4/2015
WO   2010045726 A1   4/2010
(Continued)

OTHER PUBLICATIONS

International Search Report and Written Opinion for International Patent Application No. PCT/SE2018/050165, dated Apr. 16, 2018, 9 pages.
(Continued)

*Primary Examiner* — Ziaul Karim
(74) *Attorney, Agent, or Firm* — Withrow & Terranova, PLLC

(57) ABSTRACT

Based on information from a controller scheduling data traffic in a processing arrangement, a super capacitor unit is activated, whereby reactive power is fed to a system bus of said power system. The controller is configured to have information at time t(n) about the data traffic workload of the processing arrangement at time t(n+1). By triggering discharge of the super capacitor unit based on super capacitor data at time t(n+1), transients on a system bus voltage are, at least in part, smoothed out at time t(n+1), which reduces the need for reactive power of the power system, where said transients are related to the data traffic workload of the processing arrangement. The power efficiency of the power
(Continued)

system can be improved by 3-4% by the reduction of the need for reactive power from a power grid, for which reason the electrical bill of an operator is reduced.

16 Claims, 5 Drawing Sheets

(51) Int. Cl.
    *H02J 3/28*     (2006.01)
    *H02J 7/34*     (2006.01)
    *G05B 19/042*     (2006.01)
    *H02J 13/00*     (2006.01)

(52) U.S. Cl.
    CPC ........ *H02J 7/345* (2013.01); *H02J 13/00022* (2020.01); *G05B 2219/2639* (2013.01); *H02J 2203/20* (2020.01); *H02J 2207/50* (2020.01)

(56) References Cited

U.S. PATENT DOCUMENTS

| | | |
|---|---|---|
| 5,329,222 A | 6/1994 | Gyugyi et al. |
| 8,816,531 B2 | 8/2014 | Krok et al. |
| 2010/0142509 A1* | 6/2010 | Zhu .................. H02J 7/00034 370/343 |
| 2011/0288692 A1* | 11/2011 | Scott ..................... G06F 21/55 700/297 |
| 2016/0149413 A1* | 5/2016 | Sugimoto ................ H02J 7/35 307/20 |
| 2016/0311423 A1* | 10/2016 | Storm ................... B60W 20/12 |
| 2017/0155253 A1 | 6/2017 | Veda et al. |
| 2018/0018118 A1* | 1/2018 | Raghava .................. G06F 1/08 |
| 2019/0241192 A1* | 8/2019 | Matthews ........... B60W 40/076 |

FOREIGN PATENT DOCUMENTS

| | | |
|---|---|---|
| WO | 2011013187 A1 | 2/2011 |
| WO | 2016060635 A1 | 4/2016 |

OTHER PUBLICATIONS

Examination Report for Indian Patent Application No. 202047035300, dated Feb. 3, 2021, 5 pages.

* cited by examiner

REACTIVE POWER CONTROL IN POWER SYSTEMS

This application is a 35 U.S.C. § 371 national phase filing of International Application No. PCT/SE2018/050165, filed Feb. 21, 2018, the disclosure of which is incorporated herein by reference in its entirety.

TECHNICAL FIELD

This disclosure relates to power control in power systems. More particularly, it relates to a method and a controller for controlling reactive power control in power systems.

BACKGROUND

Current technology in power systems used for 5th generation wireless systems (5G) radio/new radio (NR) and distributed cloud infrastructure fails to consider the power system behavior on the system bus voltage of said power systems. Also, in similar energy feed arrangements the behavior on the system bus voltage is not considered.

Due to radio resource allocation for mobile data transport and different power saving features, 5G radio/NR units typically have a transient behavior that affects the power system bus voltage.

Transients on the power system bus voltage create a need for reactive power, for which reason a power loss is generated. The need for reactive power is generated at an input of the power system, which input is connected to a power grid, typically an alternating current (AC) grid. This increase in reactive power need generates an increased bill in kilo-Watt-hours (kWh) addressed to a network operator.

In a cloud infrastructure, a cloud orchestrator can dedicate and allocate compute and store resources at the infrastructure. Transients are here generated on power system infrastructure, when, for instance, elastic random access networks (ERAN) distribute data to allocate resources in a distributed cloud to another location. By moving data to other locations, transients are typically also generated on distributed cloud infrastructure equipment.

Radio systems at 5G and NR sites operating at relatively high radio frequency bands apply different power saving and data control functions, can apply discontinuous transmission (DTX) in the range of 100 ms and lower. Such DTX typically generate transients on the system bus voltage of their power systems.

Moreover, data traffic in the radio access network (RAN) increasingly requires efficient wireless channel access in further radio frequency bands for mobile data transmission. This channel access and frequency allocation generates transients on the infrastructure, especially on system bus voltage, which transients are currently not handled in current power system for 5G radio/NR.

Hence, transients on the system bus voltage impact power supply units (PSUs), such that reactive power behavior of the PSU input from the power grid is affected. This affected reactive power behavior gives rise to power losses on the power systems.

When the need of reactive power increases from the power grid (AC grid), such as when using a PSU for 5G radio/NR applications, the reactive demand of the PSU will increase the electrical bill accordingly for the operator using the power system of the 5G radio/NR site. The power factor (PF) of the PSU will hence also be affected by the transient behavior of the power system voltage.

Thus, in a cloud environment, data allocation behavior similar to the one of 5G radio/NR, can be identified, when compute and store resources are allocated for incoming data.

FIG. 1 schematically presents a power system architecture according to prior art. The architecture comprises a power system 18, a digital unit (DU)/Baseband (BB) and a remote radio unit (RRU). The power system 18 comprises one or more power system units (PSUs) 12 and a power distribution unit (PDU) 13. From a power grid 11 alternating current (AC) power is provided to said one or more power system units (PSU) 12 of the power system. From said one or more PSUs 12 power is delivered on a system bus voltage to the PDU 13. From the PDU 13 power is further delivered to the RRU 16. Feedback signaling is provided between the DU/BB 15 and the RRU 16, as well as between the DU/BB 15 and the PDU 13. Also, feedback signaling is also provided between the DU/BB 15 and said one or more PSUs 12. In FIG. 1, even a standard capacitor may be used to feed reactive power to the system bus voltage between said one or more PSUs 12 and the PDU 13. Power may be delivered by a capacitor within this architecture.

A drawback with such a technique is the lack of information about when transients occur, and hence when there is a need to deliver power to the system bus voltage.

There is hence a need for an improved power control in current power systems.

SUMMARY

It is an object of exemplary embodiments herein to address at least some of the issues outlined above and to consider the power system behavior on the system bus voltage of said power systems, according to the appended independent claims, and by the exemplary embodiments according to the dependent claims.

According to one aspect, this object and others are achieved by a method of controlling reactive power of a power system. The power system comprises a power supply unit with a power input that is connected to a power grid, where the power supply unit has a power output connected to a power input of a power distribution unit that distributes power to a processing arrangement, whereby the power system serves the processing arrangement with power via the power distribution. The processing arrangement has a data traffic workload. The power system further comprises a super capacitor unit that is connected to the power output of the power supply unit. The method is performed in a controller that is connected to the processing arrangement, the power distribution unit and the super capacitor unit. The controller is configured to schedule the data traffic workload of the processing arrangement, whereby the controller is configured to have information at time t(n) about the data traffic workload of the processing arrangement at a subsequent time t(n+1), where the time t(n+1) is one time interval from, and next to, the time t(n). The method comprises obtaining at time t(n), information about data traffic workload to be processed by the processing arrangement at time t(n+1). The method also comprises estimating a power required by the processing arrangement for processing the data traffic workload scheduled at time t(n+1), based on the obtained information about the data traffic load at time t(n). Upon determining that the required power is higher than a power threshold, within the method, said method also comprises retrieving super capacitor data from a memory, where said super capacitor data corresponds to the required power. In addition, the method comprises triggering discharge of the super capacitor unit based on the super capacitor data at time t(n+1), causing power from the super capacitor unit to be fed to the power input of the power distribution unit at time t(n+1), whereby transients in a voltage at the power input of the power distribution unit are, at least in part, smoothed out at time t(n+1). This reduces the reactive power of the power system, where said transients are related to the data traffic workload of the processing arrangement.

According to a further aspect, this object and others are achieved by a controller that is operative of controlling reactive power of a power system, where the power system comprises a power supply unit with a power input connected to a power grid. The power supply unit has a power output connected to a power input of a power distribution unit that distributes power to a processing arrangement, whereby the power system serves the processing arrangement with power via the PDU. The processing arrangement has a data traffic workload. The power system further comprises a super capacitor unit that is connected to the power output of the PSU. The controller is adapted to be connected to the processing arrangement, the power distribution unit, and the super capacitor unit. The controller is configured to schedule the data traffic workload of the processing arrangement. The controller is further configured to have information at time t(n) about the data traffic workload of the processing arrangement at a subsequent time t(n+1), where the time t(n+1) is one time interval from, and next to, the time t(n). The controller comprises a processing circuitry and a memory. The memory has instructions executable by the processing circuitry, wherein said processing circuitry when executing said instructions is configured to obtain at time t(n), information about data traffic workload to be processed by the processing arrangement at time t(n+1). Said processing circuitry is, when executing said instructions also configured to estimate a power required by the processing arrangement for processing the data traffic workload scheduled at time t(n+1), based on the obtained information about the data traffic load at time t(n). Said processing circuitry is, when executing said instructions also configured to determine whether the required power is higher than a power threshold, or not. Having determined that the required power is higher than a power threshold, said processing circuitry is, when executing said instructions further configured to retrieve super capacitor data from a memory, where said super capacitor data corresponds to the required power. In addition, said processing circuitry is, when executing said instructions further configured to trigger discharge of the super capacitor unit, based on the super capacitor data at time t(n+1), by which power from the super capacitor unit can be fed to the power input of the power distribution unit at the subsequent time t(n+1). Transients in a voltage at the power input of the power distribution unit are hereby, at least in part, smoothed out at time t(n+1), which reduces the reactive power of the power system, where said transients are related to the data traffic workload of the processing arrangement.

The present disclosure also comprises a computer program for controlling reactive power of a power system. This computer program comprises instructions which, when executed on at least one processor, cause the at least one processor to carry out the method according to claims 1 to 8.

The present disclosure also comprises a computer-readable storage medium that has thereon said computer program.

The present disclosure comprises the following advantages.

It is an advantage that activation of a super capacitor unit mounted in the power system stabilizes the system bus voltage, and reduces the transient behavior on the system bus voltage, as experienced by the power system unit. A reduction in the transient behavior of the system bus voltage, as experienced by the power system unit, minimizes the demand for reactive power and hence power losses internally, which is also advantageous.

By using traffic information from a controller, activation and control of the super capacitor mounted in the power system, can be achieved such that a transient behavior on system bus voltage is improved. The accomplished improved transient behavior of system bus voltage reduces the demand for reactive power of the power system input from an AC grid.

Hereby, power efficiency of the power system can be improved by 3-4% by reducing the incoming reactive power need to the power system. Accordingly, the electrical bill of an operator is reduced, which clearly also is an advantage.

BRIEF DESCRIPTION OF THE DRAWINGS

Embodiments will now be described in more detail, and with reference to the accompanying drawings, in which.

DETAILED DESCRIPTION

Figure 1:
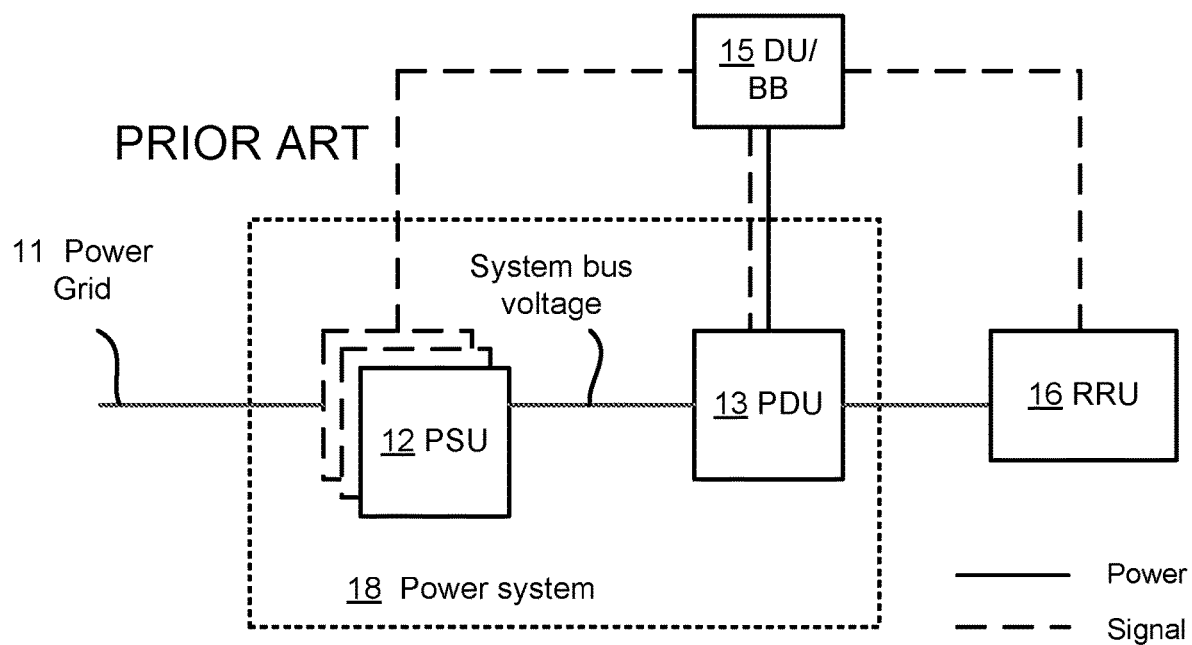
FIG. 1 schematically illustrates an architecture of a power system, according to the prior art.

In the following description, exemplary embodiments will be described in more detail, with reference to accompanying drawings. For the purpose of explanation and not limitation, specific details are set forth, such as particular examples and techniques in order to provide a thorough understanding.

Hence, there is a demand for an improved power control circumventing or at least diminishing issues, associated with transients on system bus voltage, in current power systems for 5G radio/NR and distributed cloud infrastructure.

This disclosure improves the transient behavior of power systems for 5G radio/NR and distributed cloud infrastructure, which improves the power efficiency. By reducing the need for reactive power from AC grids at the input of power systems, the power efficiency of the power systems is reduced. By saving power, electricity costs are reduced.

In short, by mounting a super capacitor unit inside a power system and by controlling activation of said super capacitor unit based on traffic data from a controller, such as a digital unit(DU)/Baseband (BB) or orchestrator, the transient behavior of the system bus voltage, as experienced by the power system, is reduced.

By applying the super capacitor unit and controlling the activation thereof, transients on the system bus voltage are affected, which improves the transient behavior. An improved transient behavior, as experienced by the power system unit, reduces the need for input reactive power to the power system, from an AC grid connected to the power system.

Transient behavior on system bus voltage hence affects the need for reactive power of the power system, also impacts the behavior of the power factor (PF) of the power system unit (PSU) on the power system. The power factor may be defined as the ratio of the real power flowing to, for instance, a power system, to the apparent power of the power system, where the apparent power depends to the reactive power of the power system.

Super capacitors or super capacitor units have properties that enable rapid energy delivery, in comparison with valve regulated lead acid (VRLA) batteries or other type of energy storage, for that matter. The fast reaction delivery of energy from the super capacitor unit is here utilized to smooth out, or even eliminate, transients or dips on the system voltage bus based on information from a controller, when applying this disclosure in a distributed cloud environment.

By activating a super capacitor unit based on information from the controller, power is momentarily added to the system bus voltage to smooth out said transients or dips, which reduces the transient behavior of the system bus voltage as experienced by the power system unit, for which reason the need for reactive power need from the AC grid is reduced. Subsequent to activation, the super capacitor is advantageously charged at times when the information from controller or orchestrator indicates less than peak, data or, traffic levels for the power demand of 5G radio/NR systems or distributed cloud environment.

A DU/BB or an orchestrator, being examples of the controller, has at a time t(n) information about traffic data and hence also the power needed for subsequent transmission at a time t(n+1), i.e. information about traffic data is available at a point in time, which point is adjacent to the point in time at which the power is needed. By using this data traffic information, and basing the activation of the super capacitor unit on this information, energy from an activated super capacitor unit can meet the transient or dip at a time at which they occur, which can result in smoothening of system bus voltage, as experienced from the power system unit. The controller may thus activate the super capacitor unit while sending data traffic to a processing arrangement.

In the case of a distributed cloud infrastructure, a super capacitor can be installed in the cloud infrastructure on a distributed cloud, and be orchestrated by an orchestrator to activate the super capacitor unit such that a system bus voltage is smoothed out and the need for reactive power of the power system used, is reduced.

It is thus herein proposed to take into account the power system behavior on the system bus voltage of said power system. As described above, power systems used for 5G radio/NR or distributed cloud infrastructure applications may have a transient behavior. Since transients on the system bus voltage causes a need for reactive power from an AC grid feeding the power system, transients give rise to power losses and accordingly an electricity bill increase for an operator using the power system.

The present disclosure has a number of advantageous properties. Activation of a super capacitor mounted in the power system stabilizes the system bus voltage, and reduces the transient behavior on the system bus voltage, as experienced by the power system unit. A reduction in the transient behavior of the system bus voltage, as experienced by the power system unit, minimizes the demand for reactive power and hence power losses internally.

By using traffic information from a controller or orchestrator, activation and control of the super capacitor mounted in the power system, can be activated and controlled such that a transient behavior on system bus voltage is improved. The accomplished improved transient behavior of system bus voltage reduces the demand for reactive power of the power system input from an AC grid.

Hereby, power efficiency of the power system can be improved by 3-4% by reducing the incoming reactive power need to the power system. Accordingly, the electrical bill of an operator is reduced.

The 5G radio/NR systems, have radio requirements with higher demands regarding power saving functionality with respect to fast reaction and fast turn on/off of data traffic. It is noted that the same requirements of higher demand are requested in cloud infrastructure, in which also low latency is a requirement.

In 5G radio/NR, various physical resource blocks (PRBs) are allocated within a corresponding frame structure. When features configured to save radio power are activated generate disturbances on the system bus voltage. These disturbances or transients generate power losses on the power system unit (PSU) and on a distribution system connected to it, for instance a 40 m long cable.

The power losses may be due to voltage variations as created on the distribution system having a high inductance on the copper wire. Voltage variations on a high inductance wire create a demand for reactive power. This demand of reactive power causes the active power as delivered from the PSU to dip on the system bus voltage. This in turn activates the PSU to immediate deliver power to respond to the dip. The PSU thus demands both a reactive power as well as an active power, from an alternating current (AC) grid that is feeding the PSU with power.

Accordingly, the power taken from the grid comprises active power as well as reactive power. When active and reactive power is taken from grid, a corresponding electricity bill in kWh, increases, due to increased consumption by 5G radio/NR radio or a distributed cloud environment. This kWh consumption of electricity is to be paid by the operator.

Moreover, a circuitry present inside a power system unit (PSU), which is called power factor (PF), has the task to try to keep the voltage and current of the AC grid at the PSU input in balance and in-line/in-phase between input AC voltage and input AC current. Whenever there is a mismatch between AC voltage and AC current, which mismatch can depend on transients on a cable having an inductance, an angle (T) is created between voltage and current. The power factor may be defined as cosine T. The measure cosine T represents the mismatch in AC voltage and AC current, which the power factor (PF) circuit inside the PSU attempts to compensate for.

The generation of reactive power thus generates losses, with the result of an increased electrical bill for the operator, because more reactive power is need when transients or variations exist on the system bus voltage on the radio unit in question.

The present disclosure diminishes the reactive AC power component as demanded by the PSU from the AC grid. This in turn reduces the electrical bill for the operator and increases the efficiency of the power system, when the transient behavior of the system bus voltage is improved.

The introducing a super capacitor unit, and activating the super capacitor unit based on data traffic both in 5G radio/NR, as well as in distributed cloud environments, reactive power is directly added on the power system voltage bus, at a time when it is needed. Data traffic information is provided from a controller, such as a scheduler, or an orchestrator.

The present disclosure utilizes the fact that it is known when, i.e. at what time, transients due to data traffic will occur. In addition, in the case of 5G radio/NR, this information is available at a point in time, one (1) transmission time interval (TTI) before the corresponding actual power is needed. By activating a super capacitor, within the PSU, the PF circuit inside the PSU will not have to perform a compensation for reactive power via the AC grid. In the case transients depending on radio unit output power are substantial, the transients will likely be high within the power system, e.g. on the system bus voltage.

Substantial transients on power system voltage are especially generated when radio features and other RAN-related features, temporarily scheduling reduced amounts of allocation data in time and frequency, are applied.

Within the present disclosure a super capacitor unit is utilized, for the reason that super capacitors have suitable reaction time characteristics to rapidly deliver energy upon activation. The super capacitor, or super capacitor unit, can thus rapidly, i.e. timely respond to a request from a controller or orchestrator, scheduling data traffic.

It is noted that a high cosine p value, or the PF-value, is an indicator of a reactive power need from the AC grid. This indicator may also be used as feedback to the controller or orchestrator.

Figure 2:
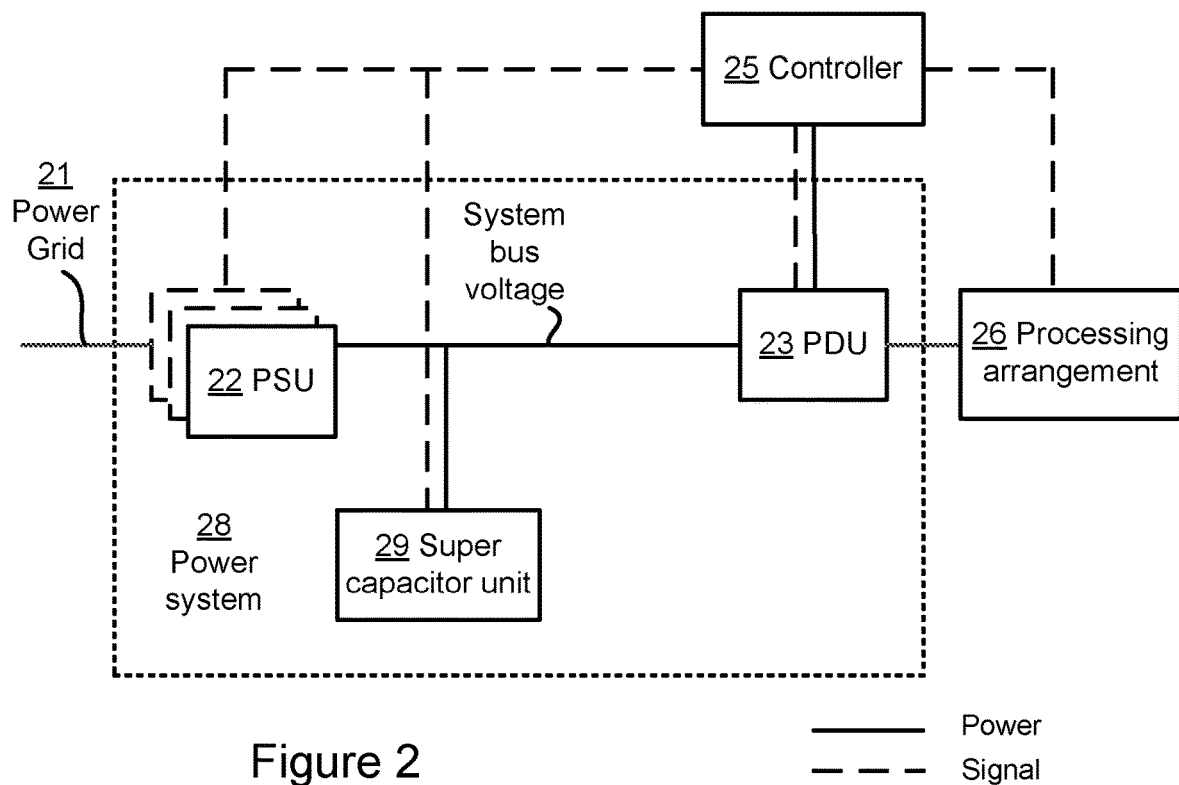
FIGS. 2 to 4 schematically illustrate architectures of power systems, according to embodiments of the present disclosure.

FIG. 2 schematically presents a power system architecture, related to the present disclosure. The power system architecture comprises a power system 28, a controller 25 and a processing arrangement 26. The power system 28 comprises one or more PSUs 22, which is/are fed with power from a power grid 21, and a PDU 23, between which a system bus voltage delivers power from the output of said one or more PSUs 22 to said PDU 23. The power system 28 also comprises a super capacitor unit 29 that is connected to the system bus voltage. In addition, the super capacitor unit 29 is controlled by the controller 25. The PDU 23 delivers power to the processing arrangement 26. Also, the processing arrangement 26 is controlled by the controller 25 being adapted to schedule data allocation. The controller has information about data traffic load of the processing arrangement 26 at a point in time one (1) time interval in advance, relative to the timing of the data traffic load. This enables the controller to activate the super capacitor unit 29 at a subsequent time interval, to timely deliver power to the system bus voltage such that a variation or dip in the system bus voltage is, at least partly, smoothed out.

Figure 3:
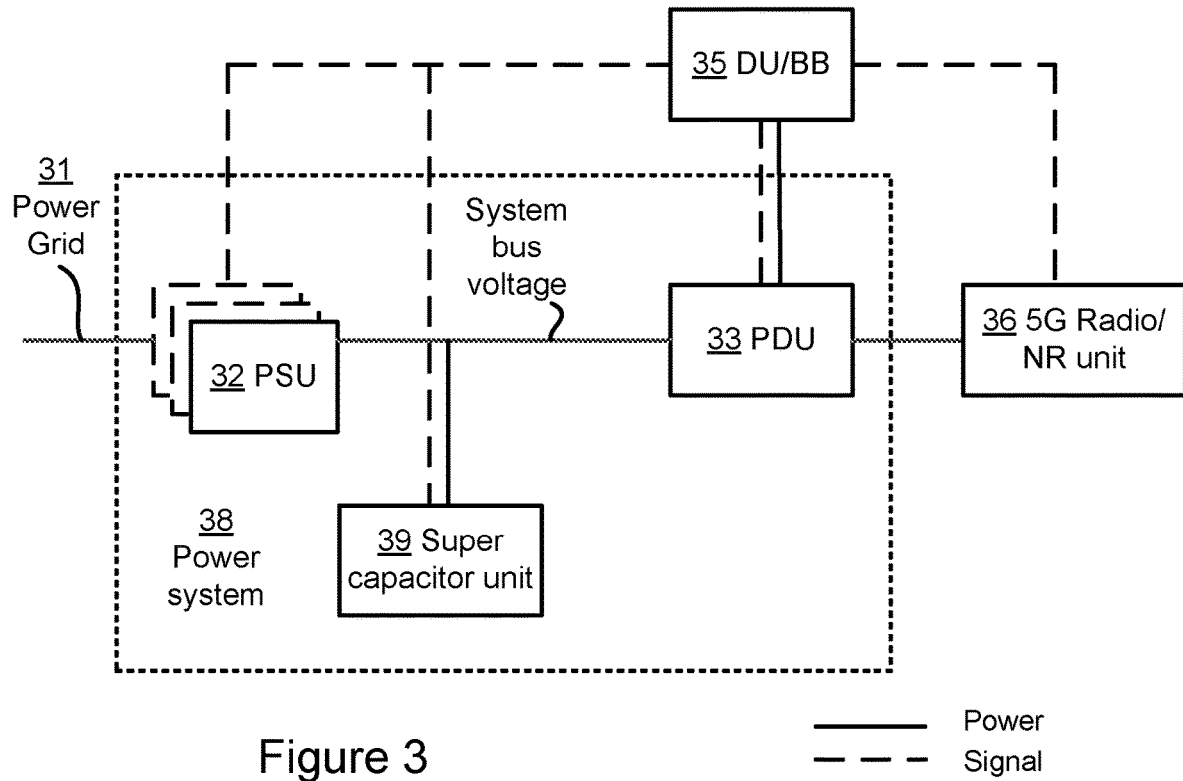

FIG. 3 schematically presents an embodiment of the power system architecture of the power system architecture as presented in FIG. 2. The power system architecture as presented in FIG. 3 comprises a power system 38, comprising one or more PSUs 32, which is/are fed with power from a power grid 31, and a PDU 33, between which a system bus voltage delivers power from the output of said one or more PSUs 32 to said PDU 33. The power system architecture as presented in FIG. 3 comprises a digital unit (DU)/Baseband (BB) 35, which may be considered to be a specification of the generalized controller 25 of FIG. 2. Similarly, this power system architecture of FIG. 3 also comprises a 5G radio/new radio (NR) unit 36, which can be considered to be a specification of the generalized processing arrangement 26 of FIG. 2.

In addition, the power system 38 comprises a super capacitor unit 39 that is connected to the system bus voltage, between the output of said one or more PSUs and the PDU 33. Within this embodiment as presented in FIG. 3, the super capacitor unit 39 is controlled by the DU/BB 35. The PDU 33 delivers power to the 5G radio/NR unit 36, corresponding to the processing arrangement 26 of FIG. 2. Also, the 5G radio/NR unit 36 is controlled by the DU/BB 35 being adapted to schedule data allocation. The DU/BB 35 has information about data traffic load of the 5G radio/NR unit 36 at a time one (1) transmission time interval (TTI) in advance, relative to scheduling of the data traffic load. This enables the DU/BB 35 to activate the super capacitor unit 39 at a point in time when the data traffic is scheduled, to timely deliver power to the system bus voltage such that a variation or dip in the system bus voltage is, at least partly, smoothed out.

It is noted that the energy demand from a power system architecture, when utilized in connection with 5G radio/NR, is relatively high. Due to controller allocation, such as scheduler allocation, of data traffic and power saving functions or radio features, data amount corresponding to a certain predetermined power rating, may generate variations or transients on the system bus voltage. Such variations or transients will thus give rise to the need for reactive power from said one or more PSUs.

It has been noted that by using a super capacitor unit, and by controlling the activation of said super capacitor unit, power can be saved on said one or more PSUs, eliminating the need for reactive power from the power grid 31, i.e. an AC grid. Such power savings may be up 3-4% for a relatively high quality grid, and 4-6% for a relatively low quality grid.

As mentioned above, the present disclosure can be implemented in a power system in a distributed cloud infrastructure. In a distributed cloud infrastructure, the need to perform compute and storage operations, based on incoming data may generate power system variations or transients. Such variations or transients create power losses in the distributed infrastructure.

Figure 4:
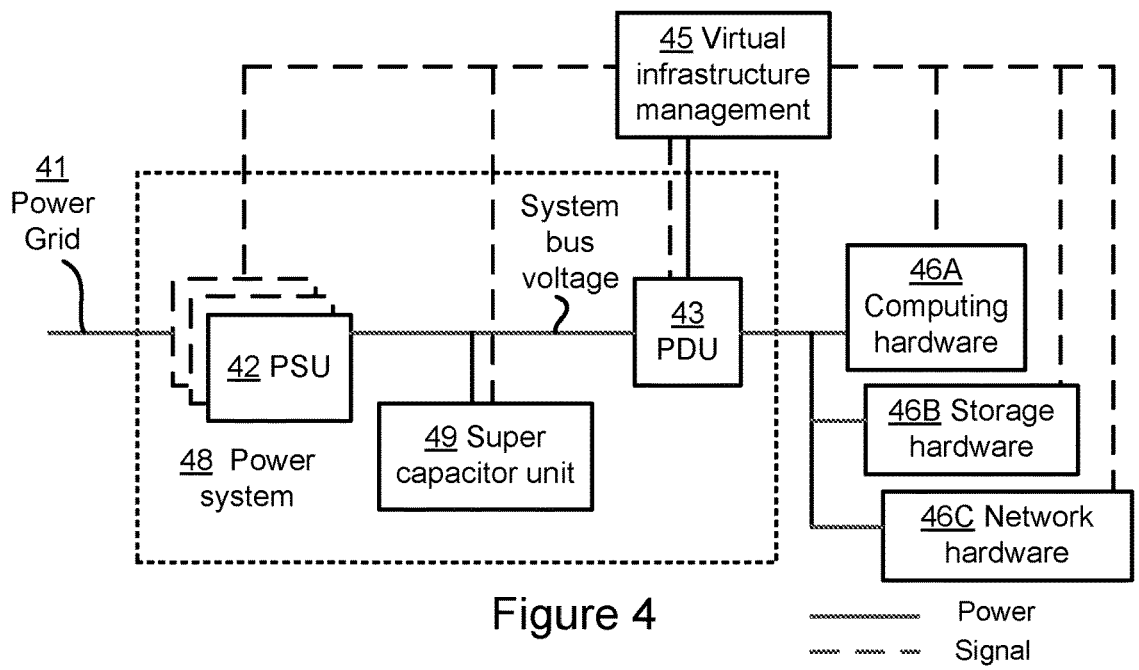

FIG. 4 schematically presents a further embodiment of the power system architecture of the power system architecture as presented in FIG. 2. FIG. 4 comprises a power system 48 having one or more PSUs 42, a PDU 43 and a super capacitor unit 49. Similar to the case in FIG. 3, said one or more PSUs 42 provides a system bus voltage to the PDU 43. The distributed cloud infrastructure further comprises hardware components 46A-C, which are fed by power from the PDU 43. The hardware components may comprise a computing hardware 46A, storage component 46B and/or a network component 46C. The power system architecture in a distributed cloud infrastructure also comprises a virtual infrastructure management 45, such as an orchestrator, which corresponds to the controller 25 of FIG. 2, and which controls said one or more PSUs 42, the super capacitor unit 49, the PDU 43, as well as the hardware components 46A-C, by signaling.

Utilizing the super capacitor unit 49 can improve transient behavior on system bus of the power system 48, and at the same time save power. The orchestrator or the virtual infrastructure management 45 can in a distributed cloud environment control the super capacitor unit 49 to smooth out or even eliminate variations or transients of the voltage on the system bus. In the case of a distributed cloud infrastructure, the virtual infrastructure management, of for that matter the orchestrator, has advance information about compute and store requirements needed for a neighboring subsequent time interval. These compute and store requirements may thus be the requirements of the computing hardware 46A, storage hardware 46B and the network hardware 46C.

As opposed to transmission time interval (TTI) as used in the embodiment when implementing a power system in a 5G radio/NR environment, the time interval as used in the current embodiment when implementing the present disclosure in a distributed cloud infrastructure, the meaning of the time interval typically depends on a current application. For instance, the time interval may be shorter for real-time, dynamic applications, for example fleet management, crowd control, etc., or longer for applications showing more predictable patterns of behavior, for instance monitoring-type of applications, such as temperature in forests, traffic monitoring, etc.

The time interval may vary, discretely. For instance, consecutive time intervals may be 100 milliseconds (ms), 10 ms, 20 ms, etc.

Technically, for compute resources, for instance the computing hardware 46A, metrics such as floating point operations per second (FLOPS) or millions of instructions per second (MIPS)/billions of instructions per second (BIPS) may be used as a metric for correlating power consumption of the infrastructure with demands of applications running in the infrastructure.

It is known that FLOPS or MIPS of an application can be measured. For a certain function granularity, the orchestrator can know in advance which function will be executed on incoming data. Also, these metrics can be correlated to power consumption based on processor type and processor frequency, being used.

For storage resources, for instance the storage hardware 46B, requirements for read/seek/write operations can also be correlated with power consumption in watts. For example, reference tables exit on average power requirement for read or write operations can be used for volatile, for instance, random access memory (RAM) of nonvolatile storage, for instance, hard disc drive (HDD)/solid state disc (SSD).

It is pointed out that the power system architecture in a distributed cloud infrastructure may be similar to the one of a 5G radio/NR site infrastructure. A cloud power system infrastructure such as a data center has however typically a higher power demand; power demands being up to 50 kW, 100 kW or even 200 kW.

Within the embodiments of the disclosure as described above, a controller, such as a DU/BB or a virtual infrastructure management, has information about a data traffic load at a point in time one (1) time interval before said data traffic load is processed or transmitted. The meaning, and duration, of one (1) such the time interval typically depends on the application in question, as mentioned above.

However, by slightly modifying an embodiment of the ones described, it would be possible to take into consideration a more predictive approach when it comes to deciding when to activate, i.e. trigger the use of, a super capacitor unit. This more predictive approach may be implemented and executed within the 5G radio/NR unit or in the cloud in which case a different radio technology is targeted.

It is envisaged that there are different possibilities to implement such a predictive approach. According to one example, an autoregressive moving average model (ARIMA) that assumes that an evolving variable, which here corresponds to energy consumption, can be forecasted based on past values thereof. In order to have ARIMA working, a historical data set would thus be needed and used as input. If deploying such an approach in a cloud environment, a relatively large data set would be needed as input.

The ARIMA approach uses as input time series data [x1, x2, ..., xn], where smaller indices denote earlier in time, as opposed to higher indices denoting later in time. This approach uses moving average windows in order to smooth out a function and to make said function as predictable as possible. Dependent on the dataset to which the approach is applied, predictability can be portioned on an hourly, daily, weekly basis, etc.

Various tests can be applied such as the Dickery-Fuller test in order to determine whether input dataset is stationary or not, where stationary implies that mean, variance, auto-covariance values are time-invariant. In the case the data set is time-invariant; the ARIMA model can be applied to the dataset, by which predictions are made. Predicting calculations may be expressed as a function f(x)=arima(input, ahead=8), where the ahead-parameter specifies how many time units, such as hours, the model shall predict the function f(x).

Figure 5:
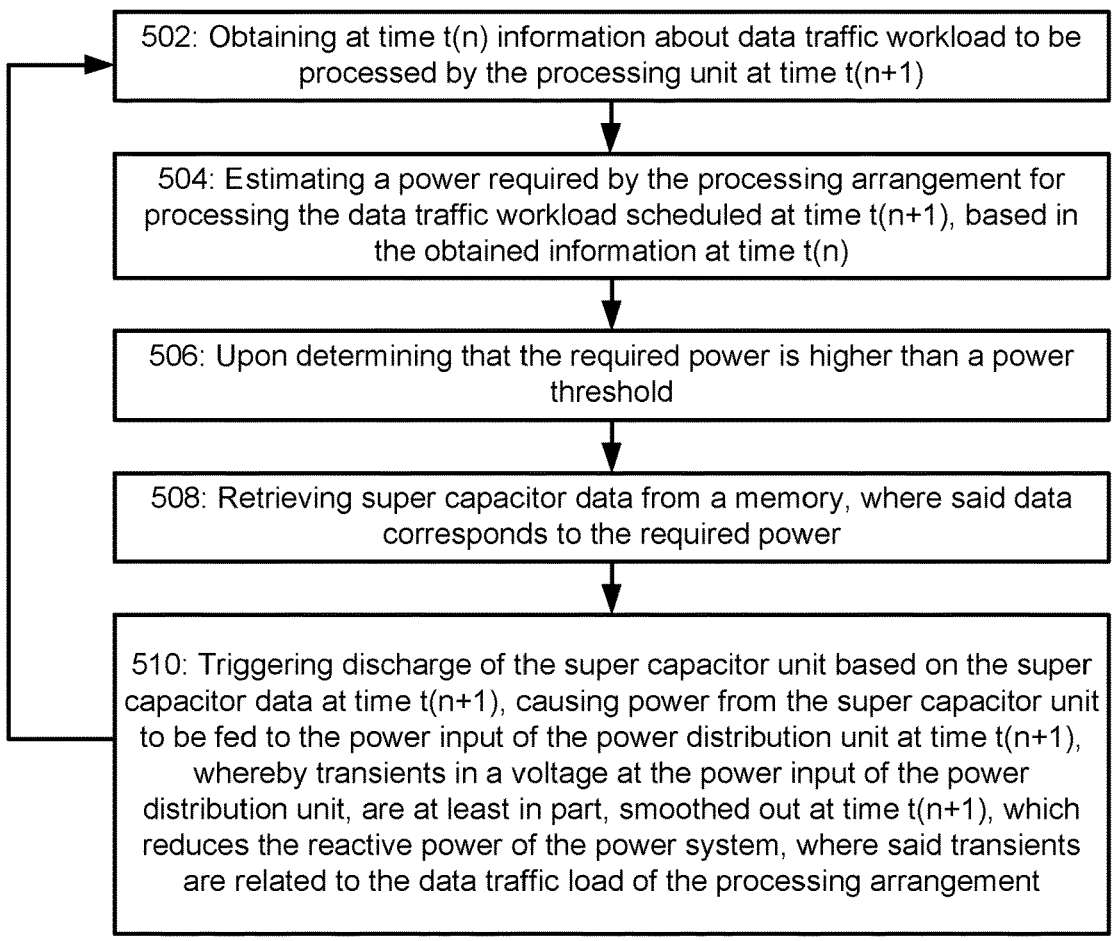
FIGS. 5 and 6 illustrate flow charts of actions in method performed in controller, according to embodiments of the present disclosure.

FIG. 5 illustrates a flow chart of method actions for controlling reactive power of a power system. The power system comprises a power supply unit (PSU) that has a power input connected to a power grid, and has a power output connected to a power input of a power distribution unit (PDU) distributing power to a processing arrangement. The power system serves the processing arrangement with power via the PDU, where the processing arrangement has a data traffic workload. The power system further comprises a super capacitor unit that is connected to the power output of the PSU. The method is performed by a controller connected to the processing arrangement, the PDU and the super capacitor unit. The controller is configured to schedule the data traffic workload of the processing arrangement, whereby the controller is configured to have information at time t(n) about the data traffic workload of the processing arrangement at a subsequent time t(n+1), where the time t(n+1) is one time interval from, and next to, the time t(n). The flowchart comprises the following actions:

Action 502: Obtaining at time t(n), information about data traffic workload to be processed by the processing arrangement at time t(n+1).

Action 504: Estimating a power required by the processing arrangement for processing the data traffic workload scheduled at time t(n+1), based on the obtained information about the data traffic load at time t(n).

Action 506: Upon determining that the required power is higher than a power threshold:

Action 508: Retrieving super capacitor data from a memory, where said super capacitor data corresponds to the required power.

Action 510: Triggering discharge of the super capacitor unit based on the super capacitor data at time t(n+1). This causes power from the super capacitor unit to be fed to the power input of the power distribution unit at time t(n+1), whereby transients in a voltage at the power input of the power distribution unit are, at least in part, smoothed out at time t(n+1), reducing the reactive power of the power system, where said transients are related to the data traffic workload of the processing arrangement.

Action 510 of triggering discharge of the super capacitor unit, may cause discharging of the super capacitor unit, whereby transients in the voltage at the power input of the power distribution unit are diminished.

Within the method as presented in the flowchart of FIG. 5, the processing arrangement may comprise a remote radio unit (RRU), or communication hardware.

Within the method as presented in flowchart of FIG. 5, the controller may comprise a scheduler of a radio communication system or an orchestrator of a distributed network system.

Figure 6:
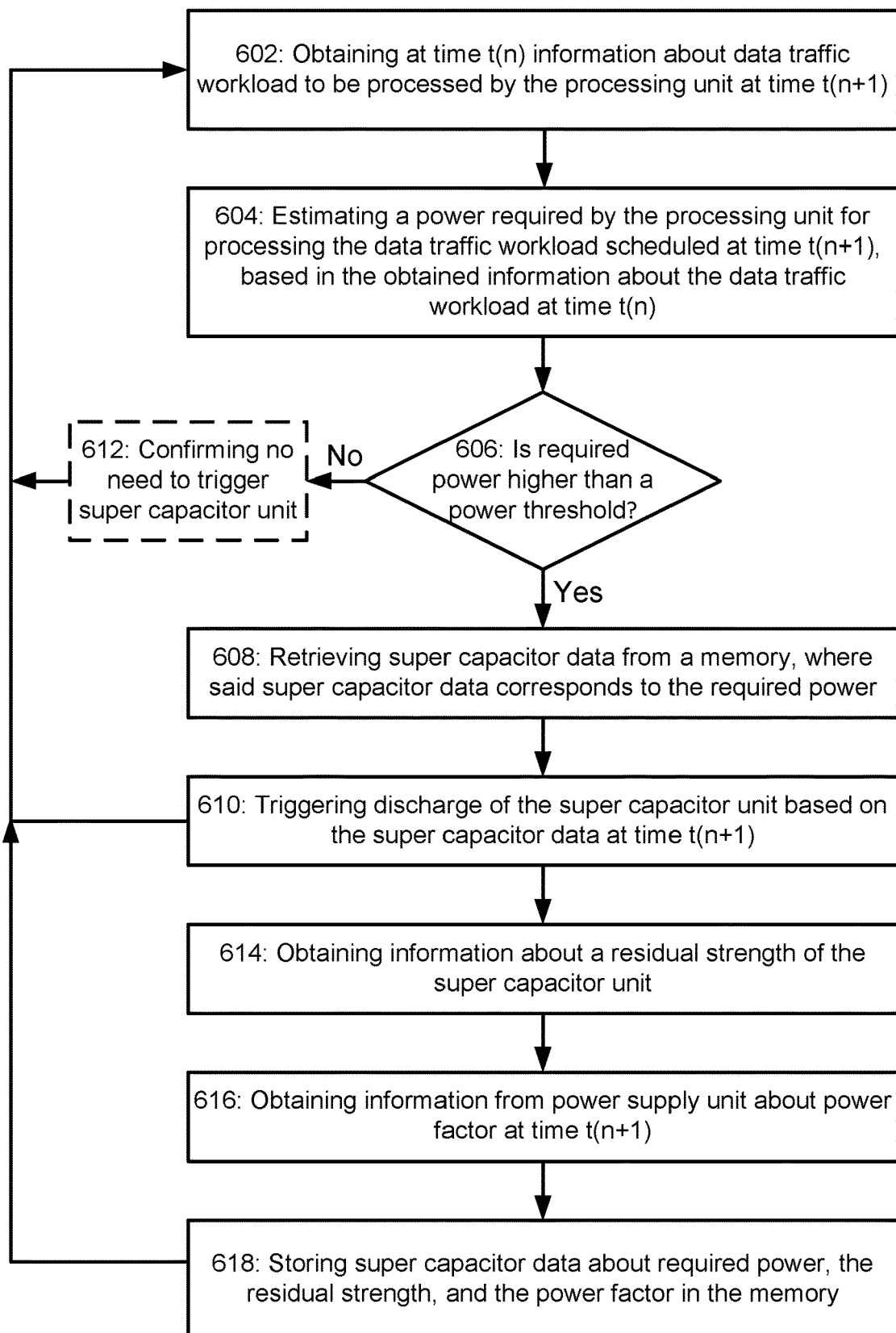

FIG. 6 illustrates, similar to FIG. 5, a flow chart of method actions for controlling reactive power of a power system. The power system comprises a power supply unit (PSU) that has a power input connected to a power grid, and has a power output connected to a power input of a power distribution unit (PDU) distributing power to a processing arrangement. The power system serves the processing arrangement with power via the PDU, where the processing arrangement has a data traffic workload. The power system further comprises a super capacitor unit that is connected to the power output of the PSU. The method is performed by a controller connected to the processing arrangement, the PDU and the super capacitor unit. The controller is configured to schedule the data traffic workload of the processing arrangement, whereby the controller is configured to have information at time t(n) about the data traffic workload of the processing arrangement at a subsequent time t(n+1), where the time t(n+1) is one time interval from, and next to, the time t(n). This flowchart comprises the following actions:

Action 602: Obtaining at time t(n), information about data traffic workload to be processed by the processing arrangement at time t(n+1).

Action 604: Estimating a power required by the processing arrangement for processing the data traffic workload scheduled at time t(n+1), based on the obtained information about the data traffic load at time t(n).

Action 606: Determining whether the required power is higher than a power threshold. If the query in action 606 is answered with a "Yes", action 608 follows.

Action 608: Retrieving super capacitor data from a memory, where said super capacitor data corresponds to the required power.

Action 610: Triggering discharge of the super capacitor unit based on the super capacitor data at time t(n+1). This causes power from the super capacitor unit to be fed to the power input of the power distribution unit at time t(n+1), whereby transients in a voltage at the power input of the power distribution unit are, at least in part, smoothed out at time t(n+1), reducing the reactive power of the power system, where said transients are related to the data traffic workload of the processing arrangement. This action may be followed by action 602, as above.

If the query in action 606 is answered with a "No", action 612 of confirming that there is no need to trigger the super capacitor unit. This action is optional.

Subsequent to action 610 the following may occur.

Action 614: Obtaining information about residual strength of the super capacitor unit at time t(n+1) after thee discharge at time t(n+1).

Action 616: Obtaining information from power supply unit about power factor at time t(n+1).

Action 618: Storing super capacitor data about the required power, the residual strength, and the power factor, in the memory. Action 618 may be followed by action 602, as above.

It is noted that action 604 of estimating the power required by the processing arrangement may be based on super capacity data as retrieved from the memory.

Action 610 of triggering discharge of the super capacitor unit, may cause discharging of the super capacitor unit, whereby transients in the voltage at the power input of the power distribution unit are diminished.

Within the method as described in the flowchart of FIG. 6, the processing arrangement may comprise a remote radio unit (RRU), or communication hardware.

Within the method of FIG. 6, the controller may comprise a scheduler of a radio communication system or an orchestrator of a distributed network system.

It is noted that the super capacitor unit may comprise one or more super capacitors. These one or more super capacitors may be activated separately. Alternatively, a plurality of these super capacitors may be activated at the same time, to achieve and deliver a higher power to the system bus voltage.

It is noted that super capacity data as comprised in the memory, from action 608, may be based on historical activations, power needs and power factor values. The super capacity data may hence also comprise information on what amount of the super capacitor unit is to be activated. Whether one, two or more parts, or whether even the entire super capacitor is to be activated, or triggered.

The present disclosure also comprises a computer program adapted to control reactive power of a power system, where the computer program comprises instructions which, when executed on at least one processor, cause the at least one processor to carry out the method of the flowcharts as presented in FIG. 5 or 6.

The present disclosure also comprises a computer-readable storage medium that has thereon said computer program.

Figure 7:
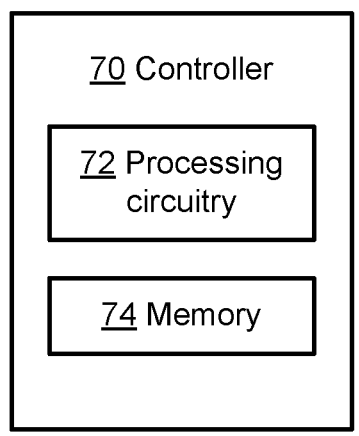
FIG. 7 schematically illustrates a controller, according to embodiments of the present disclosure.

FIG. 7 schematically presents a controller 25, 70 that is operative of controlling reactive power of a power system 28, 38, 48), where the power system comprises a power supply unit (PSU) 22, 32, 42 with a power input connected to a power grid 21, 31, 41. The PSU has a power output connected to a power input of a power distribution unit (PDU) 23, 33, 43 that distributes power to a processing arrangement 26, whereby the power system serves the processing arrangement via the PDU with power, where the processing arrangement has a data traffic workload. The power system further comprises a super capacitor unit 29, 39, 49 that is connected to the power output of the PSU. The controller 25, 70 is adapted to be connected to the processing arrangement 26, the PDU 23, 33, 43 and the super capacitor unit 29, 39, 49. The controller 25, 70 is configured to schedule the data traffic workload of the processing arrangement, whereby the controller 25, 70 is further configured to have information at time t(n) about the data traffic workload of the processing arrangement 26 at a subsequent time t(n+1), where the time t(n+1) is one time interval from, and next to, the time t(n). The controller 25, 70 comprises a processing circuitry 72 and a memory 74. The memory 74 has instructions executable by the processing circuitry 72, wherein said processing circuitry 72 when executing said instructions is configured to obtain at time t(n), information about data traffic workload to be processed by the processing arrangement 26 at time t(n+1). Said processing circuitry 72 when executing said instructions is also configured to estimate a power required by the processing arrangement 26 for processing the data traffic workload scheduled at time t(n+1), based on the obtained information about the data traffic load at time t(n). Said processing circuitry 72 when executing said instructions is also configured to determine whether the required power is higher than a power threshold, or not. Having determined that the required power is higher than a power threshold, said processing circuitry 72 when executing said instructions is further configured to retrieve super capacitor data from a memory, where said super capacitor data corresponds to the required power. In addition, said processing circuitry 72 when executing said instructions is further configured to trigger discharge of the super capacitor unit 29, 39, 49 based on the super capacitor data at time t(n+1), by which power from the super capacitor unit can be fed to the power input of the power distribution unit at time t(n+1). Transients in a voltage at the power input of the power distribution unit are hereby, at least in part, smoothed out at time t(n+1), which reduces the reactive power of the power system 28, 38, 48, where said transients are related to the data traffic workload of the processing arrangement.

The time t(n) denotes a point in time, which may be considered to be positioned along a time line, at an incremental index value n. The time t(n+1) similarly denotes a point in time, which may be considered to be positioned along the time line, at an incremental index value of n+1. Since the increment indices differ by one (1) time interval, the time points t(n) and t(n+1) are next to each other in time.

The time interval or granularity in time, which is used in the application, is applied by the controller and may depend on the application. In the 5G radio/NR case, the granularity or resolution in time may be the transmission time interval (TTI). In the case of distributed virtual environment, the resolution in time may be a time interval that further may depend on the actual application.

Said processing circuitry 72 may further, when executing said instructions, be configured to obtain information about a residual strength of the super capacitor unit 29, 39, 49 at time t(n+1) following the discharge at time t(n+1). Said processing circuitry 72 may further, when executing said instructions, be configured to obtain information from the power supply unit 22, 32, 42 about a power factor at time t(n+1). Also, the processing circuitry 72 may also, when executing said instructions, be configured to store super capacitor data about the required power, the residual strength and the power factor in the memory. Said processing circuitry 72 may also, when executing said instructions, be configured to estimate the power required by the processing arrangement 26 based on super capacity data as retrieved from the memory. In addition, when executing said instructions, said processing circuitry 72 may also be configured to cause discharging of the super capacitor unit 29, 39, 49, whereby transients in the voltage at the power input of the PDU 23, 33, 43 will be diminished.

Moreover, the controller 25, 70 may comprise a scheduler that is adapted to schedule the data traffic workload of a radio communication system.

According to some embodiments of the present disclosure, the processing arrangement 26 of the controller 25, 70 comprises a remote radio unit (RRU) of a radio communication system.

The controller 25, 70 may comprise virtual infrastructure management 45 or an orchestrator being adapted to orchestrate the data traffic workload in a distributed network system.

According to some further embodiments of the present disclosure, the processing arrangement 26 of the controller 25, 70 comprises communication hardware 46A-46C in a virtual infrastructure. This communication hardware may comprise computing hardware 46A, storage hardware 46B and/or network hardware 46C.

The present disclosure also teaches a controller 25 that is operative to control reactive power of a power system 28, 38, 48, where the power system comprises a power supply unit (PSU) 22, 32, 42 with a power input connected to a power grid 21, 31, 41. The PSU has a power output connected to a power input of a power distribution unit (PDU) 23, 33, 43 that distributes power to a processing arrangement 26, whereby the power system serves the processing arrangement via the PDU with power, where the processing arrangement has a data traffic workload. The power system further comprises a super capacitor unit 29, 39, 49 that is connected to the power output of the PSU. The controller 25 is adapted to be connected to the processing arrangement 26, the PDU 23, 33, 43 and the super capacitor unit 29, 39, 49. The controller 25 is configured to schedule the data traffic workload of the processing arrangement, whereby the controller 25 is further configured to have information at time t(n) about the data traffic workload of the processing arrangement 26 at a subsequent time t(n+1), where the time t(n+1) is one time interval from, and next to, the time t(n). The controller 25 is further adapted to obtain at time t(n), information about data traffic workload to be processed by the processing arrangement 26 at time t(n+1). The controller 25 is also adapted to estimate a power required by the processing arrangement 26 for processing the data traffic workload scheduled at time t(n+1), based on the obtained information about the data traffic load at time t(n). The controller 25 is also adapted to determine whether the required power is higher than a power threshold, or not. Having determined that the required power is higher than a power threshold, the controller 25 is adapted to retrieve super capacitor data from a memory, where said super capacitor data corresponds to the required power. In addition, the controller 25 is adapted to trigger discharge of the super capacitor unit 29, 39, 49 based on the super capacitor data at time t(n+1), by which power from the super capacitor unit can be fed to the power input of the power distribution unit at time t(n+1). Transients in a voltage at the power input of the power distribution unit are hereby, at least in part, smoothed out at time t(n+1), which reduces the reactive power of the power system 28, 38, 48, where said transients are related to the data traffic workload of the processing arrangement.

The controller 25 may further be adapted to obtain information about a residual strength of the super capacitor unit 29, 39, 49 at time t(n+1) subsequent to the discharge at time t(n+1).

The controller 25 may further be adapted to obtain information from the power supply unit 22, 32, 42 about a power factor at time t(n+1).

The controller 25 may further be adapted to store super capacitor data about the required power, the residual strength and the power factor in the memory.

The controller 25 may further also be adapted to estimate the power required by the processing arrangement 26 based on super capacity data as retrieved from the memory.

Moreover, the controller 25 may be adapted to cause discharging of the super capacitor unit 29, 39, 49, whereby transients in the voltage at the power input of the PDU 23, 33, 43 will be diminished.

The controller 25 may comprise a scheduler that is adapted to schedule the data traffic workload of a radio communication system.

It is noted that energy feed arrangements, other than the power grid 21, 31, 41, may also be envisaged.

Examples and embodiments as described herein, comprise the following advantages and preferable features:

Activation of a super capacitor unit mounted in the power system stabilizes the system bus voltage, and reduces the transient behavior on the system bus voltage, as experienced by the power system unit. A reduction in the transient behavior of the system bus voltage, as experienced by the power system unit, minimizes the demand for reactive power and hence power losses internally.

By using traffic information from a controller or orchestrator, a super capacitor unit being mounted in the power system, can be activated and controlled such that a transient behavior on system bus voltage is improved. The accomplished improved transient behavior of system bus voltage reduces the demand for reactive power of the power system input from an AC grid.

Hereby, power efficiency of the power system can be improved by 3-4% by the reduction of the need for reactive power to the power system, or any similar energy feed arrangement. Accordingly, the electrical bill of an operator is reduced, which clearly is advantageous.

It may be further noted that the above described embodiments are only given as examples and should not be limiting to the present exemplar embodiments, since other solutions, uses, objectives, and functions are apparent within the scope of the embodiments as claimed in the accompanying patent claims.

ABBREVIATIONS 5G 5th generation wireless systems
AC alternating current
ARIMA autoregressive moving average model
BB base band
BFU battery fuse unit
BIPS billions of instructions per second
DTX discontinuous transmission
DU digital unit
ERAN elastic RAN
FLOPS floating point operations per second
HDD hard disc drive
kW kilo Watt
kWh kW hours
m meter
ms milli second
MIPS millions of instructions per second
NR new radio
PDU power distribution unit
PF power factor
PRB physical resource block
PSU power supply unit
RAM random access memory
RAN radio access network
RF radio frequency
SSD solid state disc
TTI transmission time interval
VRLA valve regulated lead acid

The invention claimed is:

1. A method of controlling reactive power of a power system, the power system comprising a power supply unit, PSU, with a power input connected to a power grid, the PSU having a power output connected to a power input of a power distribution unit, PDU, that distributes power to a processing arrangement, whereby the power system serves the processing arrangement with power via the PDU, the processing arrangement having a data traffic workload, the power system further comprising a super capacitor unit being connected to the power output of the PSU, the method being performed by a controller connected to the processing arrangement, the PDU and the super capacitor unit, the controller being configured to schedule the data traffic workload of the processing arrangement, whereby the controller is configured to have information at time t(n) about the data traffic workload of the processing arrangement at a subsequent time t(n+1), where the time t(n+1) is one time interval from, and next to, the time t(n), the method comprising:
obtaining, at the time t(n), information about data traffic workload to be processed by the processing arrangement at the time t(n+1);
estimating a power required by the processing arrangement for processing the data traffic workload scheduled at the time t(n+1), based on the obtained information about the data traffic workload at the time t(n); and
upon determining that the power required by the processing arrangement is higher than a power threshold,
retrieving super capacitor data from a memory, where said super capacitor data corresponds to the power required by the processing arrangement; and
triggering discharge of the super capacitor unit based on the super capacitor data at the time t(n+1), such that power from the super capacitor unit is fed to the power input of the PDU at the time t(n+1), whereby transients in a voltage at the power input of the PDU are, at least in part, diminished at the time t(n+1), which reduces the reactive power of the power system, where said transients are related to the data traffic workload of the processing arrangement.

2. The method according to claim 1, further comprising obtaining information about a residual strength of the super capacitor unit at the time t(n+1) following the discharge at the time t(n+1).

3. The method according to claim 1, further comprising obtaining information from the PSU about a power factor at the time t(n+1).

4. The method according to claim 3, further comprising storing super capacitor data about the power required by the processing arrangement, a residual strength of the super capacitor unit, and the power factor in the memory.

5. The method according to claim 4, wherein estimating the power required by the processing arrangement is based on super capacity data as retrieved from the memory.

6. The method according to claim 1, wherein triggering discharge of the super capacitor unit causes discharging of the super capacitor unit, whereby transients in the voltage at the power input of the PDU are diminished.

7. The method according to claim 1, wherein the processing arrangement comprises a remote radio unit, RRU, or communication hardware.

8. The method according to claim 1, wherein the controller comprises a scheduler of a radio communication system or an orchestrator of a distributed network system.

9. A controller operative to control reactive power of a power system, the power system comprising a power supply unit, PSU, with a power input connected to a power grid, the PSU having a power output connected to a power input of a power distribution unit, PDU, that distributes power to a processing arrangement, whereby the power system serves the processing arrangement with power via the PDU, the processing arrangement having a data traffic workload, the power system further comprising a super capacitor unit being connected to the power output of the PSU, the controller being adapted to be connected to the processing arrangement, the PDU and the super capacitor unit, the controller is configured to schedule the data traffic workload of the processing arrangement, whereby the controller is configured to have information at time t(n) about the data traffic workload of the processing arrangement at a subsequent time t(n+1), where the time t(n+1) is one time interval from, and next to, the time t(n), the controller further comprising:
a processing circuitry; and
a memory having instructions executable by the processing circuitry, wherein said processing circuitry when executing said instructions is configured to:
obtain at the time t(n), information about data traffic workload to be processed by the processing arrangement at the time t(n+1);

estimate a power required by the processing arrangement for processing the data traffic workload scheduled at the time t(n+1), based on the obtained information about the data traffic workload at the time t(n); and upon determining that the power required by the processing arrangement is higher than a power threshold, retrieve super capacitor data from the memory, where said super capacitor data corresponds to the power required by the processing arrangement; and trigger discharge of the super capacitor unit based on the super capacitor data at the time t(n+1), such that power from the super capacitor unit is fed to the power input of the PDU at the time t(n+1), whereby transients in a voltage at the power input of the PDU are, at least in part, diminished at the time t(n+1), which reduces the reactive power of the power system, where said transients are related to the data traffic workload of the processing arrangement.

10. The controller according to claim 9, wherein said processing circuitry when executing said instructions is configured to obtain information about a residual strength of the super capacitor unit at the time t(n+1) following the discharge at the time t(n+1).

11. The controller according to claim 9, wherein said processing circuitry when executing said instructions is configured to obtain information from the PSU about a power factor at the time t(n+1).

12. The controller according to claim 11, wherein said processing circuitry when executing said instructions is further configured to store super capacitor data about the power required by the processing arrangement, a residual strength of the super capacitor unit, and the power factor in the memory.

13. The controller according to claim 12, wherein said processing circuitry when executing said instructions is configured to estimate the power required by the processing arrangement is based on super capacity data as retrieved from the memory.

14. The controller according to claim 9, wherein said processing circuitry when executing said instructions is configured to cause discharging of the super capacitor unit, whereby transients in the voltage at the power input of the PDU will be diminished.

15. The controller according to claim 9, wherein the controller further comprises a scheduler that is adapted to schedule the data traffic workload of a radio communication system.

16. A non-transitory computer-readable storage medium comprising a computer program product including instructions to cause at least one processor of a controller operative to control reactive power of a power system, the power system comprising a power supply unit, PSU, with a power input connected to a power grid, the PSU having a power output connected to a power input of a power distribution unit, PDU, that distributes power to a processing arrangement, whereby the power system serves the processing arrangement with power via the PDU, the processing arrangement having a data traffic workload, the power system further comprising a super capacitor unit being connected to the power output of the PSU, the controller being adapted to be connected to the processing arrangement, the PDU and the super capacitor unit, the controller is configured to schedule the data traffic workload of the processing arrangement, whereby the controller is configured to have information at time t(n) about the data traffic workload of the processing arrangement at a subsequent time t(n+1), where the time t(n+1) is one time interval from, and next to, the time t(n), to:

obtain, at the time t(n), information about data traffic workload to be processed by the processing arrangement at the time t(n+1);

estimate a power required by the processing arrangement for processing the data traffic workload scheduled at the time t(n+1), based on the obtained information about the data traffic workload at the time t(n); and upon determining that the power required by the processing arrangement is higher than a power threshold, retrieve super capacitor data from a memory, where said super capacitor data corresponds to the power required by the processing arrangement; and trigger discharge of the super capacitor unit based on the super capacitor data at t time t(n+1), such that power from the super capacitor unit is fed to the power input of the PDU at the time t(n+1), whereby transients in a voltage at the power input of the PDU are, at least in part, diminished at the time t(n+1), which reduces the reactive power of the power system, where said transients are related to the data traffic workload of the processing arrangement.

\* \* \* \* \*